US012808058B2

(12) United States Patent
Gustafson et al.

(10) Patent No.: US 12,808,058 B2
(45) Date of Patent: Nov. 24, 2026

(54) COLD SPRAYING COATING ONTO TURBINE ENGINE COMPONENT

(71) Applicant: RTX Corporation, Farmington, CT (US)

(72) Inventors: Brendan Gustafson, Vernon, CT (US); Wieslaw Kapalczynski, Cheshire, CT (US); Matthew Siopis, West Hartford, CT (US); Rohanie D. Lochan, Wellington, FL (US); Michael A. Morden, Holt, MI (US); Gary A. Wigell, Lansing, MI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/036,631

(22) Filed: Jan. 24, 2025

(65) Prior Publication Data

US 2026/0218383 A1 Jul. 30, 2026

(51) Int. Cl.
*C23C 24/04* (2006.01)
*F01D 5/28* (2006.01)

(52) U.S. Cl.
CPC .............. *C23C 24/04* (2013.01); *F01D 5/288* (2013.01); *F05D 2230/90* (2013.01)

(58) Field of Classification Search
CPC ...... C23C 24/04; F01D 5/288; F01D 2230/90
See application file for complete search history.

(56) References Cited

U.S. PATENT DOCUMENTS 6,365,222 B1 4/2002 Wagner
6,905,728 B1 * 6/2005 Hu ............................ B22F 7/08 427/140
8,343,573 B2 1/2013 Jensen
8,486,249 B2 7/2013 Almond
8,597,724 B2 12/2013 Bunting
8,601,663 B2 12/2013 Ngo
9,021,696 B2 5/2015 Jakimov
9,115,421 B2 8/2015 Ko
9,260,784 B2 2/2016 Jakimov
10,099,322 B2 10/2018 Widener
10,226,791 B2 3/2019 Dardas
10,525,529 B2 1/2020 Stoyanov
10,883,178 B2 1/2021 Sullivan
11,167,864 B2 11/2021 Cawthorne
11,692,273 B2 7/2023 Peters
2006/0051502 A1 3/2006 Hu
2008/0286108 A1 * 11/2008 Lui ......................... F01D 5/286 415/173.1
2008/0286459 A1 11/2008 Cheung
2010/0155251 A1 6/2010 Bogue (Continued)

OTHER PUBLICATIONS

EP Search Report for EP Patent Application No. 26154152.8 dated May 29, 2026.

*Primary Examiner* — Michael G Miller
(74) *Attorney, Agent, or Firm* — Getz Balich LLC

(57) ABSTRACT

A method of manufacture is provided that includes steps of: providing an airfoil body of a fan blade for a turbine engine; and cold spraying a coating onto the airfoil body at a body tip. The airfoil body includes a body leading edge, a body trailing edge and the body tip. The airfoil body extends longitudinally between the body leading edge and the body trailing edge. The airfoil body projects spanwise out to the body tip.

19 Claims, 9 Drawing Sheets

(56) References Cited

U.S. PATENT DOCUMENTS

| | | | | |
|---|---|---|---|---|
| 2013/0236323 | A1* | 9/2013 | Mironets | C23C 24/04 29/889 |
| 2015/0321217 | A1 | 11/2015 | Nardi | |
| 2016/0024942 | A1 | 1/2016 | Faughnan, Jr. | |
| 2016/0108509 | A1* | 4/2016 | Anand | F01D 5/288 427/446 |
| 2016/0305442 | A1 | 10/2016 | Strock | |
| 2017/0114466 | A1 | 4/2017 | Levy | |
| 2022/0331914 | A1 | 10/2022 | Inamdar | |

* cited by examiner

COLD SPRAYING COATING ONTO TURBINE ENGINE COMPONENT

BACKGROUND OF THE DISCLOSURE

1. Technical Field

This disclosure relates generally to a coating and, more particularly, to a method of applying a coating onto a component of a turbine engine.

2. Background Information

Various components of a turbine engine include a coating on an underlying substrate, such as an abrasive coating on a blade tip. Various methods are known in the art for applying the coating onto the underlying substrate. While these known coating methods have various benefits, there is still room in the art for improvement.

SUMMARY OF THE DISCLOSURE

According to an aspect of the present disclosure, a method of manufacture is provided that includes steps of: providing an airfoil body of a fan blade for a turbine engine; and cold spraying a coating onto the airfoil body at a body tip. The airfoil body includes a body leading edge, a body trailing edge and the body tip. The airfoil body extends longitudinally between the body leading edge and the body trailing edge. The airfoil body projects spanwise out to the body tip.

According to another aspect of the present disclosure, another method of manufacture is provided that includes steps of: providing an airfoil body of a rotor blade for a turbine engine; and cold spraying an abrasive coating onto a body tip. The airfoil body includes a body leading edge, a body trailing edge and the body tip. The airfoil body extends longitudinally between the body leading edge and the body trailing edge. The airfoil body projects spanwise out to the body tip.

According to still another aspect of the present disclosure, another method of manufacture is provided that includes steps of: providing an airfoil body of a rotor blade for a turbine engine, the airfoil body comprising a body leading edge, a body trailing edge and a body tip, the airfoil body extending longitudinally between the body leading edge and the body trailing edge, and the airfoil body projecting spanwise out to the body tip; and applying a coating onto the body tip using a cold spray process. The applying of the coating includes impinging coating feedstock material against the airfoil body to form the coating. The feedstock material includes a mixture of metal powder and at least one of metal oxide particles or carbide particles.

The airfoil body and the metal powder may be configured from or otherwise include a common metal.

The rotor blade may be a fan blade.

The airfoil body and the abrasive coating may be configured from or otherwise include a common metal.

The coating may cover at least a section of the body tip at the body leading edge.

The coating may cover at least a section of the body tip at the body trailing edge.

The coating may cover the body tip from the body leading edge to the body trailing edge.

The coating may have a thickness greater than or equal to 0.010 inches.

The coating may be configured as or otherwise include an abrasive coating.

The cold spraying of the coating may include impinging coating feedstock material against the airfoil body to form the coating. The feedstock material may be configured from or otherwise include metal powder. The airfoil body and the metal powder may be configured from or otherwise include a common metal.

The cold spraying of the coating may include impinging coating feedstock material against the airfoil body to form the coating. The feedstock material may be configured from or otherwise include metal oxide particles and/or carbide particles.

The cold spraying of the coating may include impinging coating feedstock material against the airfoil body to form the coating. The feedstock material may be configured from or otherwise include a mixture of metal power and at least one of metal oxide particles or carbide particles.

The airfoil body may be configured from or otherwise include aluminum.

The airfoil body may be configured from or otherwise include titanium.

The fan blade may also include a metal sheath bonded to the airfoil body and covering the body leading edge.

The method may also include removing a pre-existing tip coating from the airfoil body prior to the cold spraying of the coating.

The method may also include grit blasting the body tip prior to the cold spraying of the coating.

The method may also include cleaning the body tip prior to the cold spraying of the coating.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing a component of a turbine engine. The term "manufacturing" may describe methods for original manufacturing of the engine component; e.g., creating a brand new engine component. The term "manufacturing" may also or alternatively describe a method for remanufacturing or otherwise repairing the engine component; e.g., restoring one or more features of a previously formed engine component to brand new condition, similar to brand new condition, better than brand new condition, etc.

The turbine engine may be configured as or otherwise included as part of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the turbine engine is described below as a gas turbine engine such as a turbofan engine. The present disclosure, however, is not limited to such an exemplary aircraft propulsion system. The aircraft propulsion system, for example, may alternatively be configured as a turbojet propulsion system, a turboprop propulsion system, a turboshaft propulsion system or an open rotor propulsion system. Moreover, the present disclosure is not limited to propulsion system applications. The turbine engine, for example, may alternatively be configured as, or included as part of, an auxiliary power unit (APU) for the aircraft or a ground-based (e.g., industrial) electrical power system.

Figure 1:
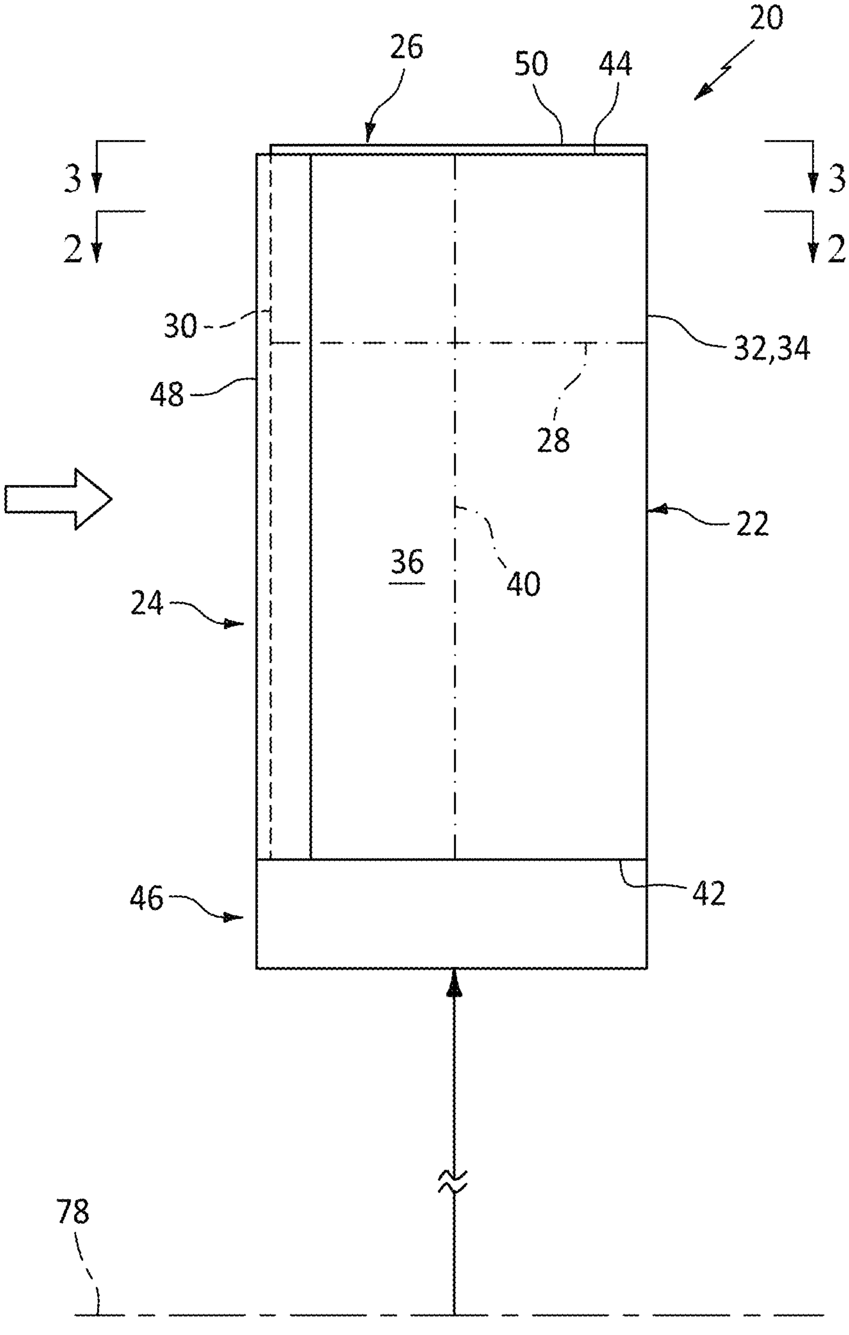
FIG. 1 is a schematic side illustration of a fan blade for a turbine engine.
Figure 2:
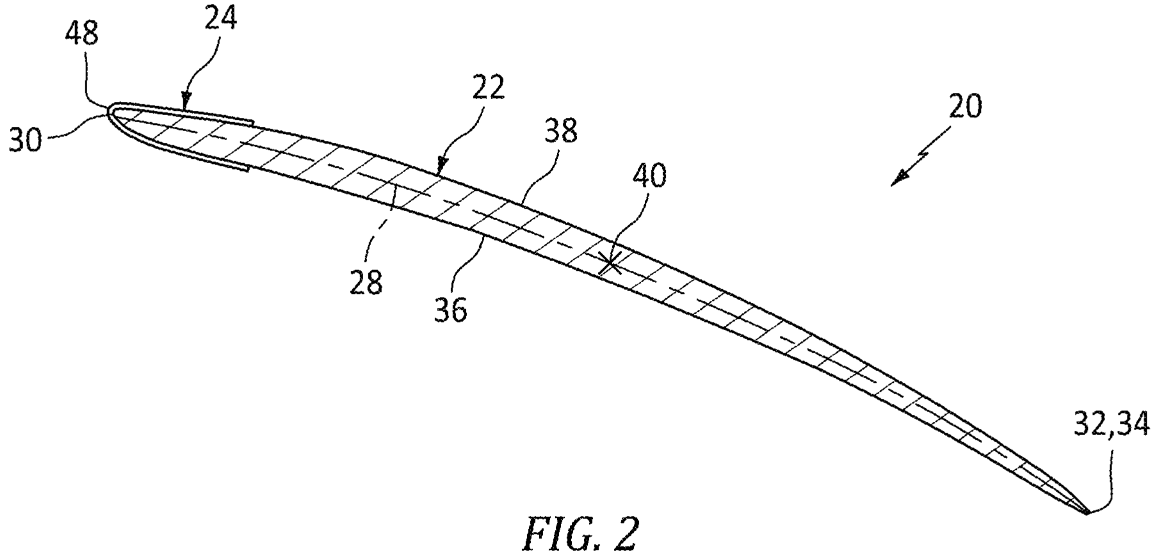
FIG. 2 is a sectional schematic illustration of the fan blade taken along line 2-2 in FIG. 1.
Figure 3:
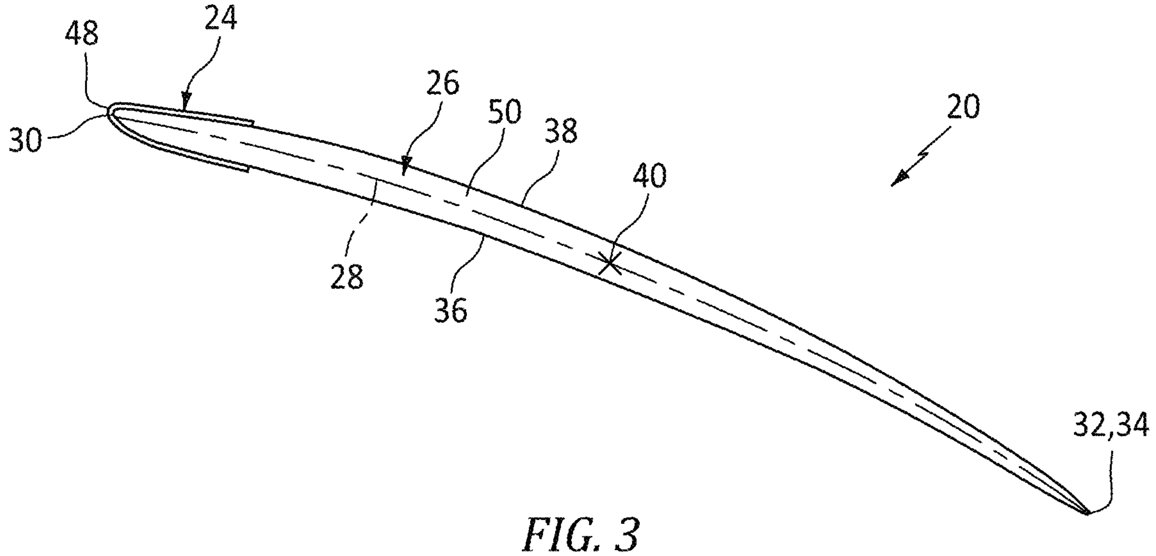
FIG. 3 is an end view schematic illustration of the fan blade taken along line 3-3 in FIG. 1.

FIGS. 1 and 2 illustrate an exemplary embodiment of the engine component configured as a turbine engine fan blade 20 for the turbine engine. The present disclosure, however, is not limited to such an exemplary engine component as described below in further detail. The fan blade 20 of FIGS. 1 and 2 includes an airfoil body 22, a blade sheath 24 and a tip coating 26 (see also FIG. 3).

Referring to FIG. 1, the airfoil body 22 of FIG. 1 extends longitudinally along a mean line 28 (e.g., a camber line) of the fan blade 20 from a leading edge 30 of the airfoil body 22 to a trailing edge 32 of the airfoil body 22. Here, the body trailing edge 32 may also form a trailing edge 34 of the fan blade 20. Referring to FIG. 2, the airfoil body 22 extends laterally between and to a first side 36 of the fan blade 20 and a second side 38 of the fan blade 20. The blade first side 36 may be a concave, pressure side of the fan blade 20. The blade second side 38 may be a convex, suction side of the fan blade 20. Referring to FIG. 1, the airfoil body 22 and each of its members 30, 32, 36 and 38 (see FIG. 2) project spanwise along a span line 40 of the fan blade 20 out from a base 42 of the airfoil body 22 to a tip 44 of the airfoil body 22. Here, the body base 42 is disposed adjacent and is connected to (e.g., formed integral with) an attachment 46 (e.g., a root) for the fan blade 20. However, it is contemplated a platform segment may alternatively be disposed between and connected to the airfoil body 22 and the attachment 46. The airfoil body 22 of FIGS. 1 and 2 may be constructed from or otherwise include metal such as, but not limited to, aluminum (Al), titanium (Ti) or a metal alloy including at least one of the foregoing.

The blade sheath 24 is bonded to the airfoil body 22 at the body leading edge 30. The blade sheath 24, for example, may be adhered to the airfoil body 22 by an adhesive. The blade sheath 24 of FIG. 1 extends spanwise along the airfoil body 22 from (or about) the body base 42 to (or about) the body tip 44. The blade sheath 24 of FIG. 1 may thereby substantially or completely form a leading edge 48 of the fan blade 20. Referring to FIG. 2, the blade sheath 24 may also project longitudinally over a leading edge section of the underlying airfoil body 22 along the blade first side 36 and/or the blade second side 38. The blade sheath 24 of FIG. 2 may thereby substantially or completely form a leading edge section of the blade first side 36 and/or a leading edge section of the blade second side 38. Here, the airfoil body 22 may form a remainder of the blade first side 36 and the blade second side 38 to the body trailing edge 32 and, more generally, to the blade trailing edge 34. The blade sheath 24 of FIGS. 1 and 2 may be constructed from or otherwise include metal such as, but not limited to, titanium (Ti) or a metal alloy of titanium. The present disclosure, however, is not limited to sheathed fan blades. In other embodiments, for example, it is contemplated the fan blade 20 may be configured without the blade sheath 24 such that the body leading edge 30 is also the blade leading edge 48.

Figure 4:
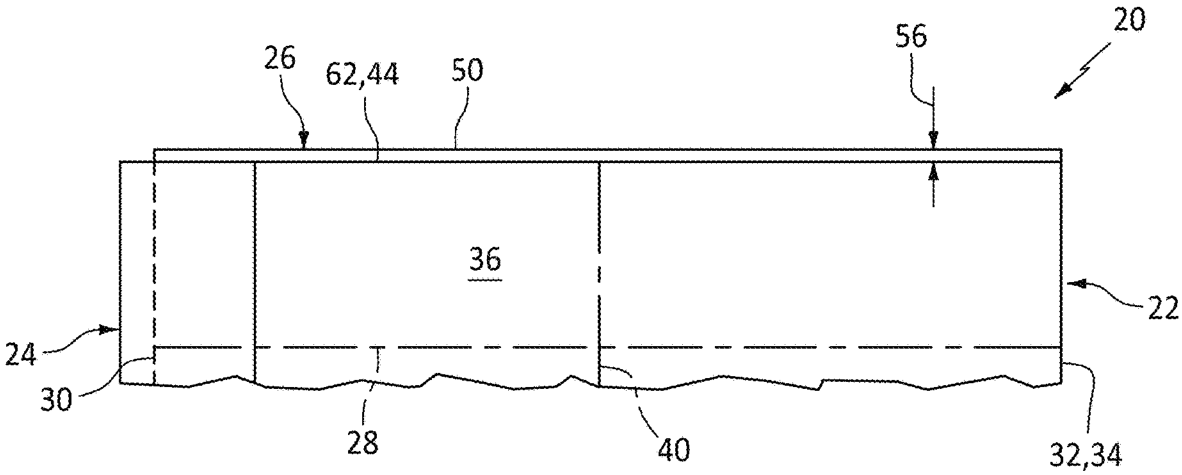
FIG. 4 is a schematic side illustration of a tip portion of the fan blade.

Referring to FIG. 4, the tip coating 26 is disposed at and at least partially or completely covers the body tip 44. The tip coating 26 of FIG. 4, for example, is bonded to the airfoil body 22 over the body tip 44. The tip coating 26 may extend longitudinally along the airfoil body 22 and its body tip 44 from (or about) the body leading edge 30 to (or about) the body trailing edge 32 and, more generally, the blade trailing edge 34. The tip coating 26 may extend laterally along the airfoil body 22 and its body tip 44 between and to the blade first side 36 and the blade second side 38 of FIG. 3. The tip coating 26 of FIGS. 3 and 4 thereby forms a spanwise tip 50 of the fan blade 20.

Figure 5:
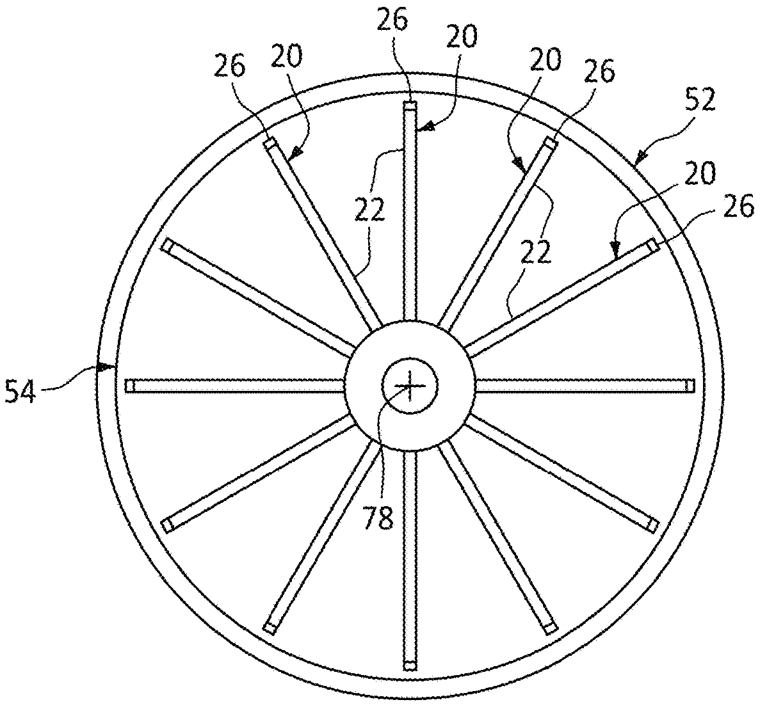
FIG. 5 is a schematic illustration of a fan rotor circumscribed by a flowpath wall.

The tip coating 26 may be configured as an abrasive coating for the fan blade 20. The tip coating 26, for example, may be relatively hard coating and/or a coating with a relatively rough surface texture. The tip coating 26 may thereby be operable to abrade away material from an adjacent component of the turbine engine such as a flowpath wall 52 as shown in FIG. 5; e.g., an abradable fan duct shroud or an abradable fan duct liner. For example, when assembled in the turbine engine, the fan blade 20 is one of a plurality of fan blades 20 included in a fan rotor 54 of the turbine engine. The flowpath wall 52 is disposed radially outboard of, axially overlaps and circumscribes the fan rotor 54. During a break-in period and/or under certain operating conditions, one or more of the fan blades 20 may each radially engage (e.g., contact) the flowpath wall 52. During this engagement, the tip coating 26 (e.g., the abrasive coating) of the respective fan blade 20 is configured to abrade away some material from the flowpath wall 52 such that the fan blade 20 self-clearances within the flowpath wall 52.

The tip coating 26 of FIG. 4 has a thickness 56 measured spanwise between the body tip 44 and the blade tip 50. This coating thickness 56 may be equal to or greater than 0.010 inches (0.2540 millimeters). The coating thickness 56, for example, may be between 0.011 inches (0.2794 millimeters) and 0.017 inches (0.4318 millimeters).

Figure 6:
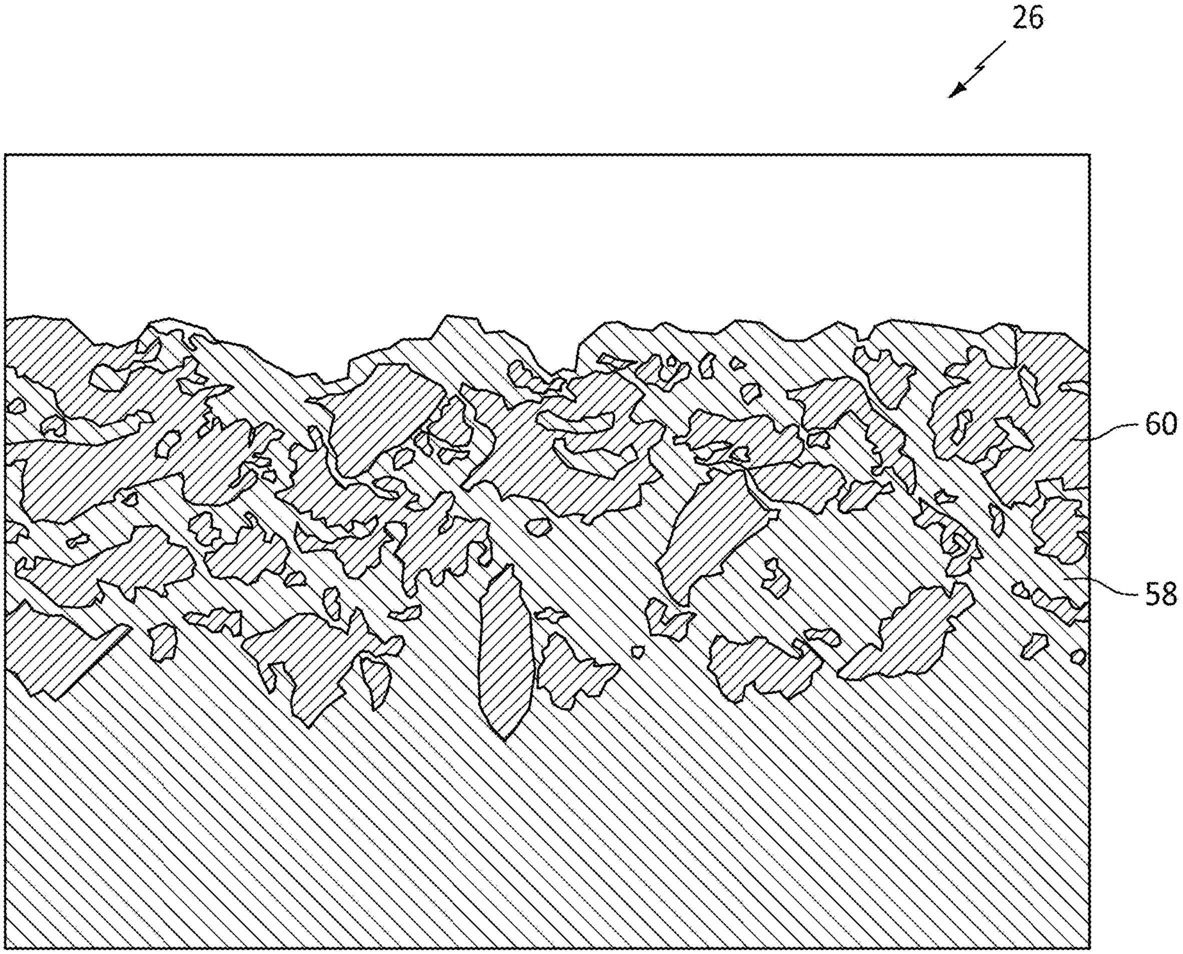
FIG. 6 is an illustration of a portion of tip coating material.

Referring to FIG. 6, the tip coating 26 may be constructed from or otherwise include an amalgamation of a first coating material 58 and a second coating material 60. The first coating material 58 is a metal such as, but not limited to, aluminum (Al), nickel (Ni), titanium (Ti), stainless steel (SS) or a metal alloy including at least one of the foregoing. In general, the metal of the first coating material 58 is selected to be the same as, or similar to, the metal forming the airfoil body 22. The second coating material 60 may be a metal oxide such as, but not limited to, an aluminum oxide ($AlO_x$) or zirconium oxide ($ZrO_x$). The second coating material 60 may alternatively be (or also include) a carbide such as silicon carbide (SiC). In one exemplary embodiment, the airfoil body 22 and the first coating material 58 may each be an aluminum alloy, and the second coating material 60 may be a zirconium oxide. Within the tip coating 26, the first coating material 58 and the second coating material 60 may (or may not) be substantially evenly mixed together.

Figure 7:
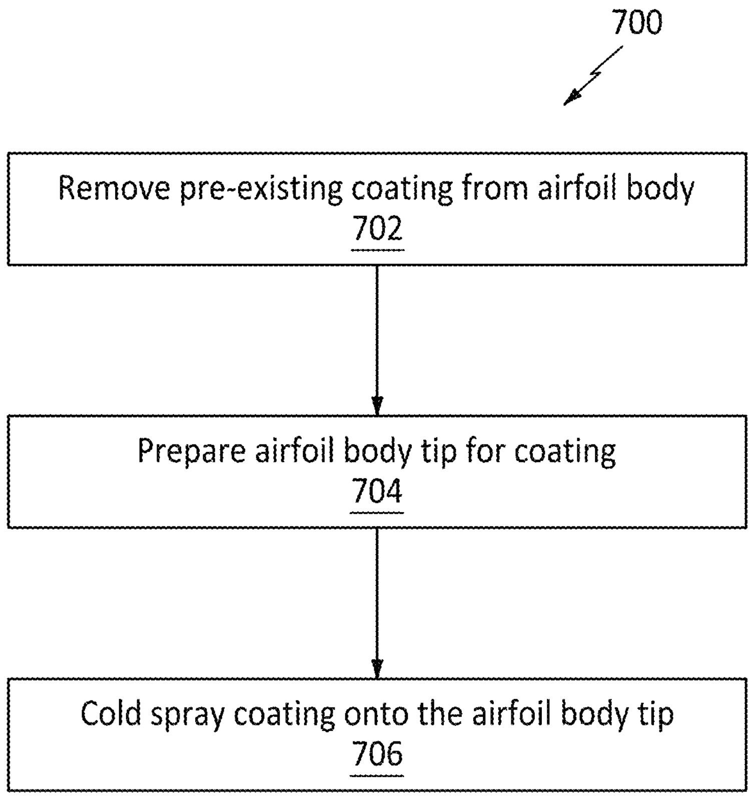
FIG. 7 is a flow diagram of a method for manufacturing a turbine engine component such as the fan blade.

FIG. 7 is a flow diagram of a method 700 for manufacturing a turbine engine component such as a rotor blade. For ease of description, the manufacturing method 700 is described below with reference to manufacturing the fan blade 20 of FIGS. 1-5. The manufacturing method 700 of the present disclosure, however, is not limited to such an exemplary turbine engine component. Moreover, the manufacturing method 700 is described below as remanufacturing or otherwise repairing a fan blade which was previously installed in a turbine engine operated onboard an aircraft. The manufacturing method 700 of the present disclosure, however, may alternatively be used to manufacture a brand new fan blade or other turbine engine component.

Figure 8A:
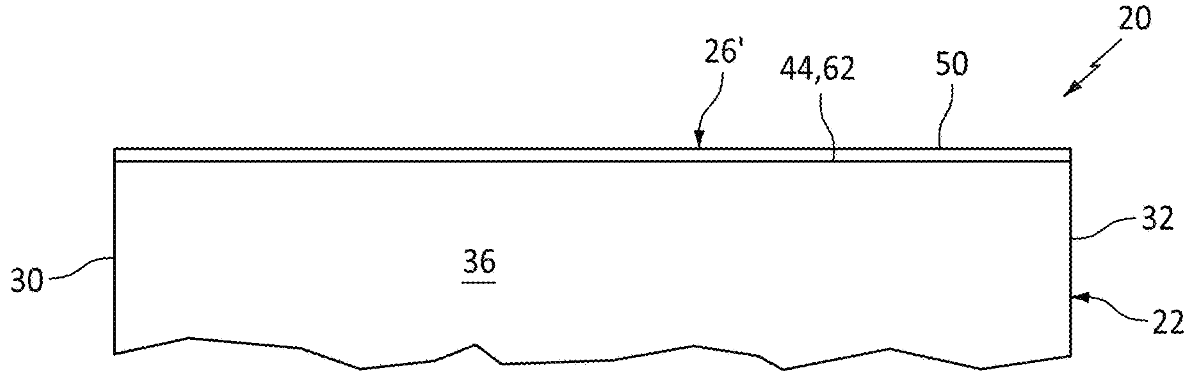
FIGS. 8A-C are schematic side illustrations of a portion of a fan blade during various steps of a manufacturing method.
Figure 8B:
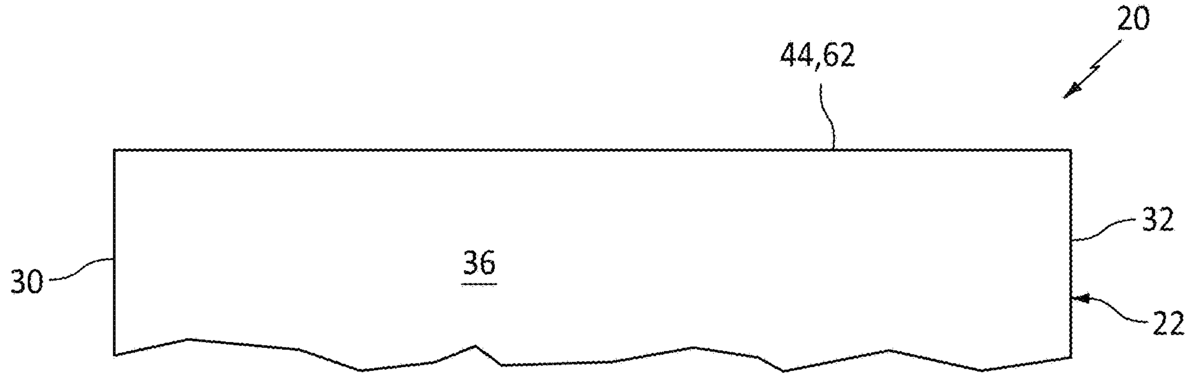

In step 702, referring to FIG. 8A, a pre-existing tip coating 26' is partially or completely removed from the underlying airfoil body 22. This pre-existing tip coating 26' may be a worn or otherwise damaged tip coating. The pre-existing tip coating 26' may be removed by grit blasting the fan blade 20 at the blade tip 50. The pre-existing tip coating 26' may also or alternatively be removed by machining the fan blade 20 at the blade tip 50. Following this step, referring to FIG. 8B, the body tip 44 of the airfoil body 22 may be partially or completely exposed.

In step 704, the exposed body tip 44 is prepared for coating. The airfoil body 22, for example, may be grit blasted to roughen up a surface 62 of the airfoil body 22 at the body tip 44 and thereby promote coating adhesion. In one exemplary embodiment, for example, the body tip 44 may be grit blasted with 60 grit aluminum oxide grit particles and/or 60 grit silicon carbide grit particles. The body tip 44 and its tip surface 62 may also (or alternatively) be cleaned using a cleaning solution; e.g., an alcohol impregnated wipe. The manufacturing method 700 of the present disclosure, however, is not limited to such exemplary coating preparation techniques.

Figure 8C:
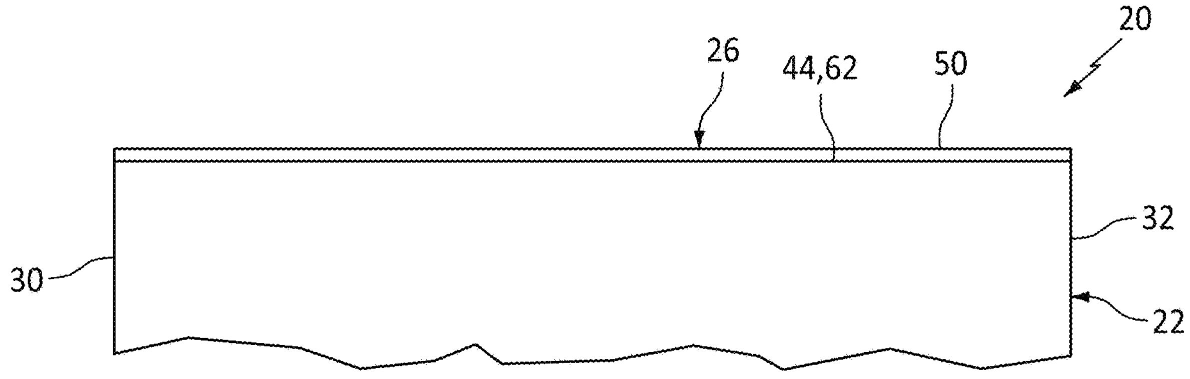

In step 706, referring to FIG. 8C, the tip coating 26 is applied onto the airfoil body 22 at the body tip 44 using a cold spray process. This tip coating 26 may be applied to cover the entire body tip 44. Alternatively, the tip coating 26 may be applied to cover a portion of the body tip 44 at (or extending longitudinally to) the body leading edge 30 or the body trailing edge 32. This partial application may be useful where only a portion of the pre-existing tip coating 26' of FIG. 8A is removed in the removal step 702; e.g., where only a portion of the pre-existing tip coating 26' of FIG. 8A needs to be repaired.

Figure 9:
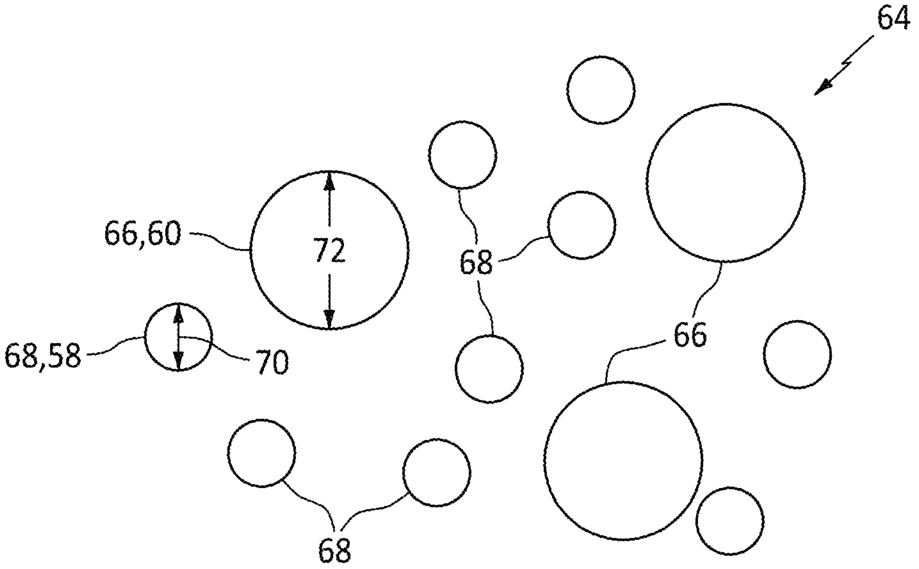
FIG. 9 is a schematic illustration of a select quantity of feedstock material particles.

Referring to FIG. 9, the cold spraying process is performed using feedstock material 64. The feedstock material 64 may be a mixture of at least (or only) metal powder and grit particles 66; e.g., solid hard phase particles. The metal power includes a solid particles 68 made of the first coating material 58. One, some or all of these powder particles 68 may be substantially spherical. One, some or all of these powder particles 68 may have a powder particle size 70 (e.g., a width, a diameter, etc.) between, for example, eighteen micrometers (18 μm) and fifty-six micrometers (56 μm), inclusive. The grit particles 66 are made of the second coating material 60. One, some or all of these grit particles 66 may be angular abrasive particles; e.g., angular, blocky and/or otherwise non-spherical particles. One, some or all of these grit particles 66 may have a grit particle size 72 (e.g., a width, etc.) between, for example, seventy-four micrometers (74 μm) and one hundred and twenty-five micrometers (125 μm), inclusive. The present disclosure, however, is not limited to the foregoing exemplary particle sizes.

Within the mixture, a percentage weight ratio of the grit particles 66/the second coating material 60 is higher than a percentage weight ratio of the powder particles 68/the first coating material 58. The grit particles 66, for example, may have a percentage weight ratio of between seventy percent (70%) and eighty percent (80%); e.g., about seventy-five percent (75%). The powder particles 68 may have a percentage weight ratio of between twenty percent (20%) and thirty percent (30%); e.g., about twenty-five percent (25%). The present disclosure, however, is not limited to the foregoing exemplary percent weight ratios, and the ratio may change to tailor one or more parameters (e.g., abrasiveness) of the tip coating 26.

Figure 10:
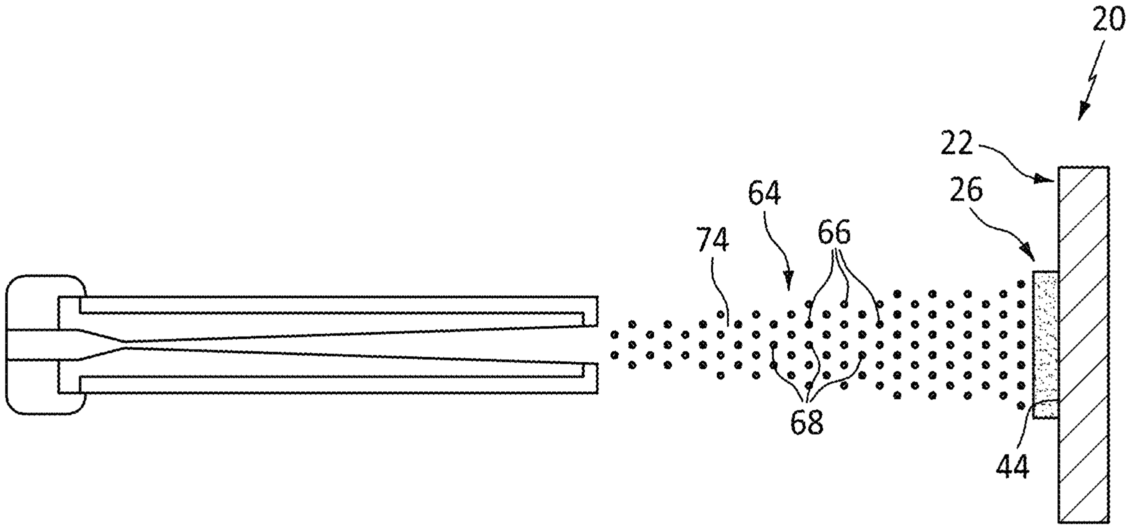
FIG. 10 is a schematic illustration of cold spraying a coating onto a body.

Referring to FIG. 10, during the cold spraying, the mixture of the metal powder and the grit particles 66 is introduced (e.g., injected) into a high-pressure flow of carrier gas 74. An example of the carrier gas 74 is an inert gas such as nitrogen gas or helium gas. The flow of the carrier gas 74 is directed towards the airfoil body 22 and its body tip 44. The feedstock material 64 and its powder particles 68 and its grit particles 66, which feedstock material particles 66 and 68 are carried by the flow of carrier gas 74, may impinge against the airfoil body 22 and its body tip 44 to form the tip coating 26. During this cold spraying process, each feedstock material particle (e.g., each powder particle 68, each grit particle 66) may impact against a target (e.g., the airfoil body 22 or previously applied tip coating material), plastically deform and mechanically interlock with the metal of the airfoil body 22 (or previously applied tip coating material). The tip coating 26 may thereby be formed without melting the powder particles 68 or the grit particles 66, as is done in other coating application processes such as a plasma spray process. By applying the tip coating 26 using the cold spray process, heat input into the underlying airfoil body 22 may be significantly reduced. This may facilitate an improved bond strength, improved coating coverage, etc. compared to, for example, a plasma spray process. Moreover, the cold spraying may be performed without preheating the airfoil body 22 and/or requiring post-coating machining and/or heat treatment.

Figure 11:
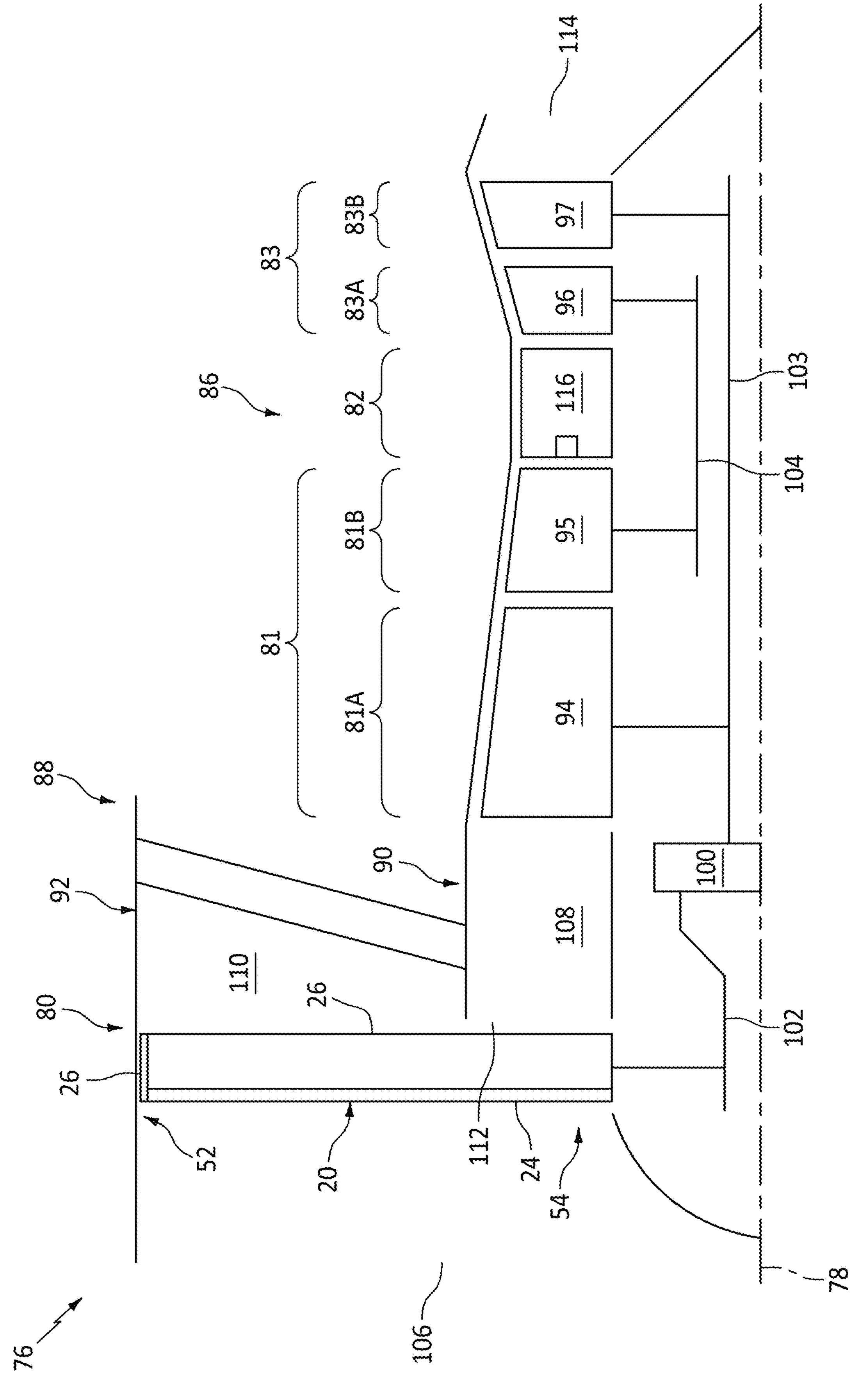
FIG. 11 is a partial side schematic illustration of the turbine engine.

FIG. 11 is a partial schematic illustration of an exemplary turbine engine 76 with which the fan blade 20 may be included. This turbine engine 76 extends axially along an axis 78 between a forward, upstream end of the turbine engine 76 and an aft, downstream end of the turbine engine 76. The turbine engine 76 of FIG. 10 includes a fan section 80, a compressor section 81, a combustor section 82 and a turbine section 83. The compressor section 81 includes a low pressure compressor (LPC) section 81A and a high pressure compressor (HPC) section 81B. The turbine section 83 includes a high pressure turbine (HPT) section 83A and a low pressure turbine (LPT) section 83B. Here, at least (or only) the LPC section 81A, the HPC section 81B, the combustor section 82, the HPT section 83A and the LPT section 83B collectively form a core 86 of the turbine engine 76.

The engine sections 80-83B are arranged sequentially along the axis 78 within an engine housing 88. This engine housing 88 includes an inner case 90 (e.g., a core case) and an outer case 92 (e.g., a fan case). The inner case 90 may house the engine core 86 and one or more of its engine sections 81A-83B. The outer case 92 may house at least the fan section 80.

Each of the engine sections 81A, 81B, 83A and 83B includes a respective bladed rotor 94-97. Each of these bladed rotors 94-97 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 54 of FIG. 11 is connected to a geartrain 100, for example, through a fan shaft 102. The geartrain 100 and the LPC rotor 94 are connected to and driven by the LPT rotor 97 through a low speed shaft 103. The HPC rotor 95 is connected to and driven by the HPT rotor 96 through a high speed shaft 104. The shafts 102-104 are rotatably supported by a plurality of bearings; e.g., rolling element and/or thrust bearings. Each of these bearings is connected to the engine housing 88 by at least one stationary structure such as, for example, an annular support strut.

During operation, ambient air from outside of the aircraft enters the turbine engine 76 through an airflow inlet 106. This air is directed across the fan section 80 and into a (e.g., annular) core flowpath 108 and a (e.g., annular) bypass flowpath 110. The core flowpath 108 of FIG. 11 extends sequentially through the LPC section 81A, the HPC section 81B, the combustor section 82, the HPT section 83A and the LPT section 83B from an airflow inlet 112 into the core flowpath 108 to a combustion products exhaust 114 out from the core flowpath 108 and the engine core 86. The air entering the core flowpath 108 may be referred to as "core air". The bypass flowpath 110 extends through a bypass duct, which bypasses (e.g., is disposed radially outboard of and extends along) the engine core 86. The air within the bypass flowpath 110 may be referred to as "bypass air".

The core air is compressed by the LPC rotor 94 and the HPC rotor 95 and is directed into a (e.g., annular) combustion chamber 116 of a (e.g., annular) combustor in the combustor section 82. Fuel is injected into the combustion chamber 116 by one or more fuel injectors and mixed with the compressed core air to provide a fuel-air mixture. This fuel-air mixture is ignited and combustion products thereof flow through and sequentially drive rotation of the HPT rotor 96 and the LPT rotor 97 about the axis 78. The rotation of the HPT rotor 96 and the LPT rotor 97 respectively drive rotation of the HPC rotor 95 and the LPC rotor 94 about the axis 78 and, thus, compression of the air received from the core inlet 112. The rotation of the LPT rotor 97 also drives rotation of the fan rotor 54 about the axis 78. The rotation of the fan rotor 54 propels the bypass air through and out of the bypass flowpath 110. The propulsion of the bypass air may account for a majority of thrust generated by the turbine engine 76 of FIG. 10, e.g., more than seventy-five percent (75%) of engine thrust. The turbine engine 76 of the present disclosure, however, is not limited to the foregoing exemplary thrust ratio.

Figure 12:
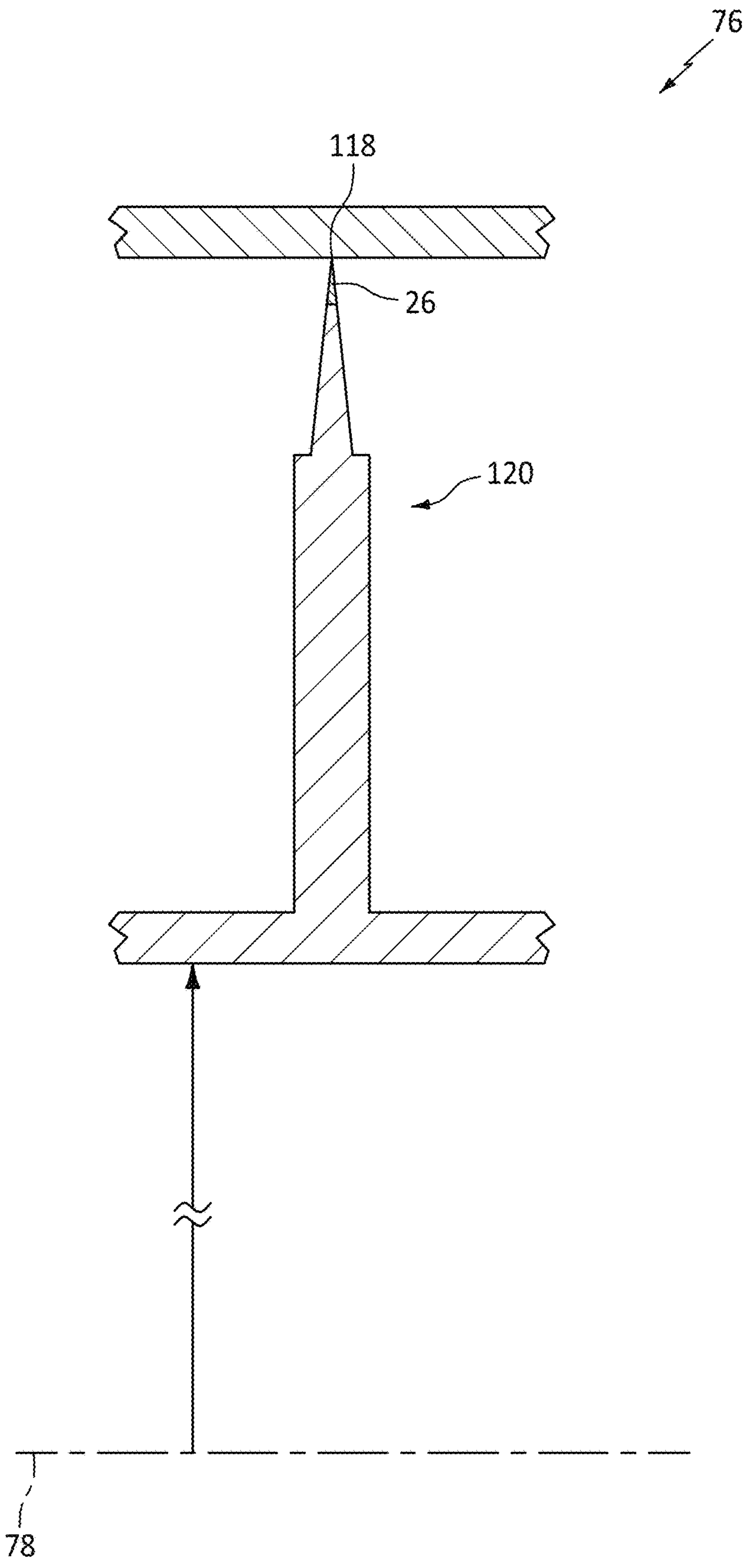
FIG. 12 is a sectional schematic illustration of a portion of the turbine engine with a seal element.

In some embodiments, the engine component manufactured using the methods described herein may be configured as a fan blade such as the fan blade 20 described above. In other embodiments, the engine component may alternatively be configured as another rotor blade (e.g., a compressor blade, a turbine blade) included in the turbine engine 76. Moreover, while the tip coating 26 is described above as being disposed at a tip of a rotor blade such as the fan blade 20, the coating 26 described above and the cold spraying process for applying that coating 26 is not limited to rotor blade applications. For example, referring to FIG. 12, the tip coating 26 may alternatively be applied to a tip 118 of a knife edge seal element 120 or various other components within the turbine engine 76.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of manufacture, comprising:

providing an airfoil body of a fan blade for a turbine engine, the airfoil body comprising a body leading edge, a body trailing edge and a body tip, the airfoil body extending longitudinally between the body leading edge and the body trailing edge, and the airfoil body projecting spanwise out to the body tip; and cold spraying a coating onto the airfoil body at the body tip, the cold spraying of the coating comprising impinging coating feedstock material against the airfoil body to form the coating, the feedstock material comprising metal powder, and the feedstock material and the airfoil body comprising a common metal.

2. The method of claim 1, wherein the coating covers at least a section of the body tip at the body leading edge.

3. The method of claim 1, wherein the coating covers at least a section of the body tip at the body trailing edge.

4. The method of claim 1, wherein the coating covers the body tip from the body leading edge to the body trailing edge.

5. The method of claim 1, wherein the coating has a thickness greater than or equal to 0.010 inches.

6. The method of claim 1, wherein the coating comprises an abrasive coating.

7. The method of claim 1, wherein the feedstock material further comprises at least one of metal oxide particles or carbide particles.

8. The method of claim 1, wherein the feedstock material comprises a mixture formed of metal power and at least one of metal oxide particles or carbide particles.

9. The method of claim 1, wherein the airfoil body comprises aluminum.

10. The method of claim 1, wherein the airfoil body comprises titanium.

11. The method of claim 1, wherein the fan blade further comprises a metal sheath bonded to the airfoil body and covering the body leading edge.

12. The method of claim 1, further comprising removing a pre-existing tip coating from the airfoil body prior to the cold spraying of the coating.

13. The method of claim 1, further comprising grit blasting the body tip prior to the cold spraying of the coating.

14. The method of claim 1, further comprising cleaning the body tip prior to the cold spraying of the coating.

15. A method of manufacture, comprising:

providing an airfoil body of a rotor blade for a turbine engine, the airfoil body comprising a body leading edge, a body trailing edge and a body tip, the airfoil body extending longitudinally between the body leading edge and the body trailing edge, and the airfoil body projecting spanwise out to the body tip; and cold spraying an abrasive coating onto the body tip, the abrasive coating comprising a mixture containing at least 70 percent weight grit particles and at least 20 percent weight powder particles, and the airfoil body and the abrasive coating comprising a common metal.

16. The method of claim 15, wherein the rotor blade comprises a fan blade.

17. The method of claim 15, wherein the grit particles comprise at least one of an aluminum oxide, zirconium oxide or silicon carbide; and the powder particles comprise at least one of aluminum, nickel, titanium, or stainless steel.

18. The method of claim 15, wherein the grit particles are evenly mixed with the powder particles.

19. A method of manufacture, comprising:

providing an airfoil body of a rotor blade for a turbine engine, the airfoil body comprising a body leading edge, a body trailing edge and a body tip, the airfoil body extending longitudinally between the body leading edge and the body trailing edge, and the airfoil body projecting spanwise out to the body tip; and applying a coating onto the body tip using a cold spray process, the applying of the coating comprising impinging coating feedstock material against the airfoil body to form the coating, the feedstock material comprising a mixture of metal powder and at least one of metal oxide particles or carbide particles, and the airfoil body and the metal powder comprising a common metal.

* * * * *